Feb. 1, 1966  M. D. BONHAM ET AL  3,231,915
MEAT CLEANING ATTACHMENT
Filed Jan. 24, 1964
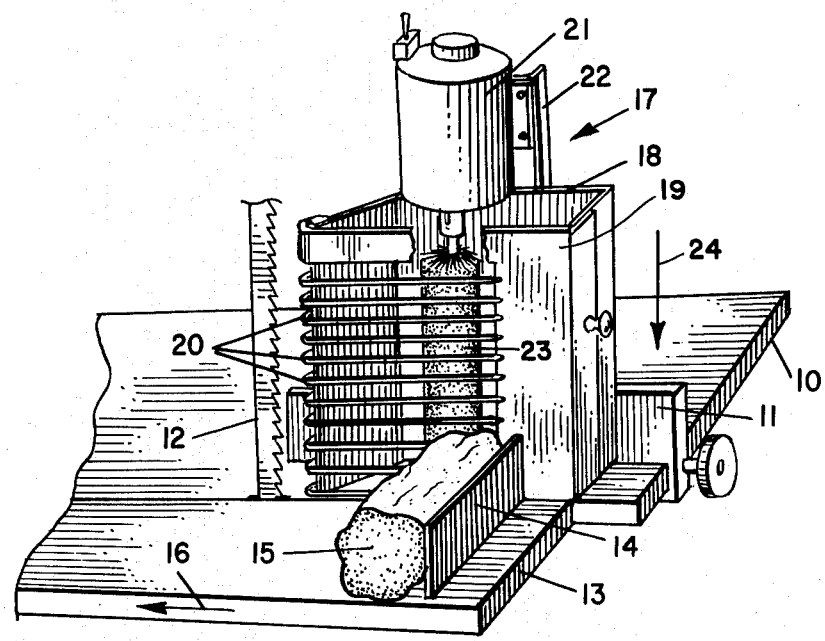
FIG. 1.
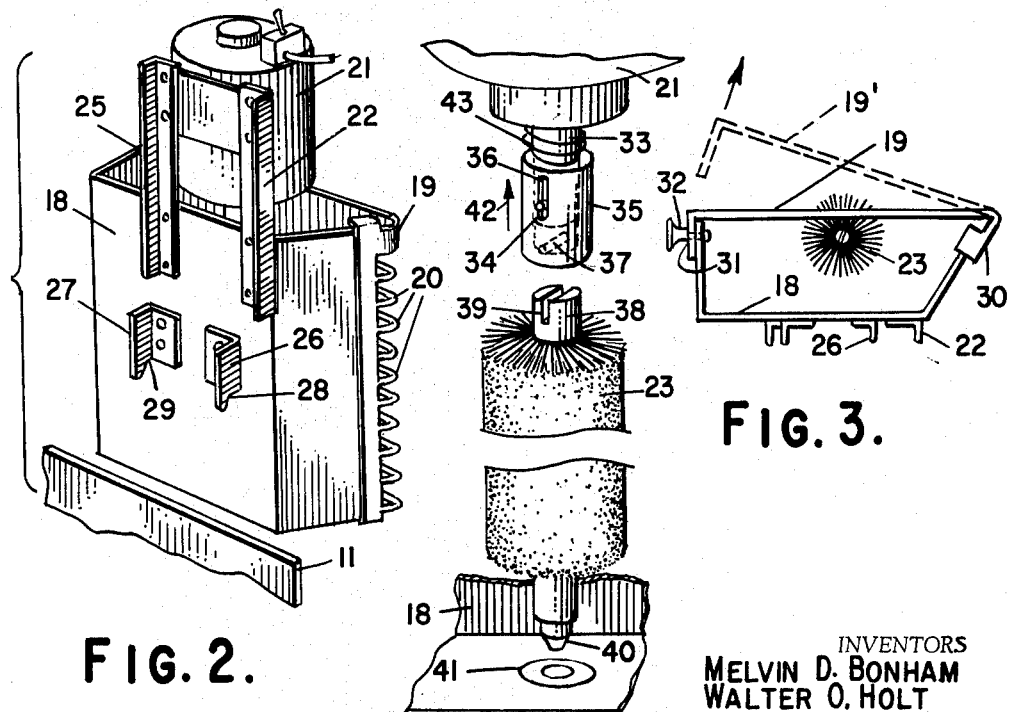
FIG. 2.
FIG. 3.
FIG. 4.
INVENTORS
MELVIN D. BONHAM
WALTER O. HOLT
BY Elliott & Pastoriza
ATTORNEYS United States Patent Office 3,231,915
Patented Feb. 1, 1966

3,231,915
MEAT CLEANING ATTACHMENT
Melvin D. Bonham, 1054 Dominion Drive, and Walter O. Holt, 1030 Dominion Drive, both of Ojai, Calif.
Filed Jan. 24, 1964, Ser. No. 340,075
4 Claims. (Cl. 15—3.1)

This invention relates to an attachment for facilitating cleaning of meat and more particularly, to a meat cleaning attachment adapted to be secured to the meat guide plate on a meat saw table.

In our co-pending patent application Serial No. 316,723, filed October 16, 1963, and now abandoned, and entitled Meat Saw and Cleaning Apparatus, there is disclosed a power operated rotary brush for cleaning meat disposed adjacent to a guide plate. The arrangement is such that one side of meat cut by the saw will be cleaned by the rotating brush as the table supporting the meat moves past the saw. Cooperating with this structure is a second power rotated cleaning brush adapted to clean the other side when the meat is passed thereover.

The structure as described in the above-mentioned application enables meat to be cut and cleaned very quickly by a single person. However, there are many instances such as in smaller butcher shops and the like, in which the system as described in the above-identified application is not necessary. Thus, there are instances in which the volume of meat handled is such that a single meat cleaning power operated brush in conjunction with a conventional saw table is sufficient. By providing a separable power operated brush which may readily be attached to different portions of a conventional guide plate and saw table, a single brush may be employed to clean both sides of the meat by simply repositioning the brush.

While portable type power operated brushes for cleaning meat have been proposed heretofore, such brushes have not incorporated simple attachment means for enabling their securement in a given position relative to a saw table to leave the butcher's hands free for cutting the meat. Further, many such power operated brushes as have been proposed heretofore, are difficult to clean.

With all of the foregoing considerations in mind, it is a primary object of this invention to provide a novel meat cleaning attachment in the form of a power operated brush capable of being readily secured, preferably to the guide plate of a saw table, in a given position to clean meat automatically as the same is being moved for cutting purposes.

More particularly, it is an object to provide a power operated rotary brush attachment for cleaning meat which may be secured in a position to clean the meat as it is being cut or alternatively, repositioned so that the brush extends in a horizontal position and meat may be simply passed thereover to effect cleaning of the meat.

Another particular object of this invention is to provide a meat cleaning attachment in which the brush and the frame rotatably mounting the brush are readily accessible for extremely easy cleaning.

Still another important object is to provide a meat cleaning attachment including meat guide means cooperating with the rotating cleaning brush to insure that meat will be properly guided relative to a cutting saw during the time that one side of the meat is being cleaned, the guiding means being so designed as to avoid the possibility of the meat becoming blocked during movement therealong.

Briefly, these and many other objects and advantages of this invention are attained by providing an attachment in the form of a box-like frame. Within the box-like frame there is rotatably mounted a brush. A cover member in turn is disposed to close the frame, portions of the cover member being made up of elongated guide rods defining open spaces therebetween communicating with the interior of the frame. Portions of the brush are exposed through these openings between the guide rods so that meat moving along the guide rods will be cleaned by the brush.

The cover itself is uniquely mounted to the frame for easy removal. In addition, unique coupling means are provided for coupling the brush to the motor in such a manner that a simple manual movement is all that is necessary to remove the brush for easy cleaning.

Novel mounting means in the form of brackets are secured to the side of the frame opposite the guide rods in a position to facilitate mounting of the attachment to the upper edge of the guide plate of a meat saw table. Alternatively, the same brackets are so designed as to define feet so that the brush may be supported in a horizontal position should it be desired to reposition the cleaning attachment.

A better understanding of the invention will be had by now referring to a preferred embodiment thereof as illustrated in the accompanying drawings, in which:

FIGURE 1 is a fragmentary perspective view of a meat saw table with a guide plate and the meat cleaning attachment in a position preparatory to securing the same to the guide plate;

FIGURE 2 is a rear perspective view of the meat cleaning attachment taken in the direction of the arrow 2 of FIGURE 1;

FIGURE 3 is a plan cross-sectional view of a portion of the cleaning attachment; and, FIGURE 4 is an exploded perspective fragmentary view of the cleaning brush and mountings therefor.

Referring first to FIGURE 1, there is illustrated a stationary saw table 10 having a conventional meat guide plate 11. The guide plate 11 is arranged to move transversely across the table 10 to adjust the thickness of a cut of meat. As shown, this thickness is determined by the spacing of the face of the guide plate 11 from a band saw 12 passing normally through the top surface of the stationary table 10.

Cooperating with the foregoing structure is a movable table 13 including an end plate 14 for supporting and urging meat 15 in a right and left direction as viewed in FIGURE 1.

In a meat cutting operation, the far end of the meat 15 is moved until it engages the guide plate 11. The movable table 13 may then be urged to the left in the direction of the arrow 16 so that the saw 12 will then cut off a piece of meat determined by its spacing from the front face of the guide plate 11.

In accordance with the instant invention, there is provided a meat cleaning attachment indicated generally by the numeral 17 and designed to be attached to the upper edge of the guide plate 11 in a position so that one side of the meat 15 will be cleaned.

With particular reference to both FIGURES 1 and 2, the meat cleaning attachment 17 which is shown in exploded view above the guide plate, includes a box-like frame 18 having a cover 19. As shown, the cover 19 includes a plurality of horizontally extending guide rods 20 defining open spaces therebetween communicating with the interior of the frame 18. A motor 21 supported by a mounting channel 22 serves to drive a cylindrically shaped brush 23 about a verical axis. The brush 23 is positioned such that a portion thereof will pass through the openings between the guide rods 20 so that meat passing along the guide surface of the cover 19 and guide rods 20 will have its surface cleaned by the brush 23. The attachment 17 is secured to the guide plate 11 by lowering the attachment in the direction of the arrow 24.

In FIGURE 2, it will be noted that there is provided a second mounting channel 25 corresponding to the channel 22 for supporting the motor 21. Also provided are bracket means 26 and 27 including lower cut-out portions or notches 28 and 29 for receiving the upper edge of the guide plate 11. By this arrangement the weight of the attachment will serve to insure that it will remain in place on the guide plate 11.

It will be clear that when the attachment 17 is secured to the guide plate 11, the guide plate is readjusted in a transverse direction or moved into the plane of the drawing as viewed in FIGURE 1 in order to accommodate the thickness of the box-shaped frame member 18. It will also be understood that the front cover face 19 and guide rods 20 will then serve as the guiding face for meat to be cut.

With reference now to FIGURE 3, it will be noted that the guide rods 20 terminate at their forward portions in a hook shape 30 to engage around the front wall of the frame 18. Also, the rear of the cover 19 terminates in a flange 31 overlapping the rear wall of the frame 18. A set screw 32 may be provided to secure the flange 31 to the rear wall as shown. By this arrangement, the cover may be swung out to the dotted line position 19' after removing or loosening the set screw and the entire front hook shape 30 unhooked from the front wall of the frame 18. Easy access is thus provided to the interior of the frame for cleaning up bits of bone dust and the like on the inside surfaces of the frame.

The brush 23 itself may be very easily uncoupled from the motor 21 and removed from the interior of the frame. Thus, with particular reference to FIGURE 4, it will be noted that the motor 21 is coupled to the upper portion of the brush 23 by a unique coupling means including a shaft portion 33 on the motor terminating in a cross-pin 34. This portion of the motor shaft is receivable in a sleeve 35 having a slot 36 for accommodating the pin 34. The pin 34 thus locks the sleeve 35 to the shaft 33 against rotation relative to the shaft but will not inhibit vertical movement of the sleeve over the shaft 33.

The lower end of the sleeve 35 includes a cross-pin 37 arranged to cooperate with the upper end of a shaft 38 for the brush 23. The shaft 38 includes a transverse or cross-slot 39 to receive the cross-pin 37 when the end of the brush shaft 38 is received in the lower end of the sleeve 35. This cross-pin 37 prevents relative rotation of the sleeve relative to the brush shaft 38.

The lower end of the brush shaft 38 terminates in a conical bearing 40 receivable in a conical bearing cavity 41 in the bottom of the frame structure 18. By providing the conical arrangement, the brush 23 may be tilted slightly after the upper portion thereof has been uncoupled from the motor shaft 33 and the brush easily removed for cleaning purposes.

Normally, the sleeve 35 will fall downwardly over the upper end of the brush shaft 38 so that the transverse pin 37 will ride in the slot 39 and the sleeve 35 will remain in position by gravity. To uncouple the brush it is thus only necessary to move the sleeve 35 upwardly in the direction of the arrow 42. However, should the attachment be removed from the guide plate 11 and layed on its back so that the sleeve 35 assumes a horizontal position, to prevent the sleeve 35 from becoming inadvertently uncoupled from the brush shaft 38, there is provided a compression spring 43 between the lower end of the motor outlet portion and the upper end of the sleeve 35. The spring 43 biases the sleeve 35 downwardly into engagement with the brush shaft 38.

A further feature of this invention resides in the channel structure for the channels 22 and 25 and the bracket mountings 26 and 27 described in conjunction with FIGURE 2. These elements are dimensioned such that they will function as feet so that the entire unit may be layed on its rear side with the brush in a horizontal position. In such position, meat may be passed across the top cover surface to have the same cleaned. Thus, the attachment is versatile in that it may be secured in a vertical position directly to the guide plate 11 or alternatively, in a horizontal position by simply resting the same flat on the stationary table 10 or the movable table 13.

In the overall operation, the attachment may be secured to the upper edge of the meat guide 11 by having this upper edge received in the notches 28 and 29 of the brackets 26 and 27. The weight of the unit will serve to secure it to the guide plate 11 and the guide plate 11 may be adjusted in a transverse direction, this movement carrying the entire attachment with it. The attachment may also be positioned towards the left or towards the right hand end of the guide plate 11; that is, closer to or further away from the saw 12. In fact, the device may be so disposed that the brush 23 is positioned beyond or to the left of the saw 12 since the brackets are positioned to the right of the brush 23 at the rear of the frame 18 as viewed in FIGURE 1. In other words, the forward guide rods 20 and brush extend to the left sufficiently to position the brush beyond the saw 12.

Meat 15 may then be urged against the front face 19 of the attachment and with this front face 19 properly spaced from the saw blade 12 in accordance with the desired thickness of a cut, the meat 15 is urged on the movable table 13 past the brush 23 wherein the outside thereof is cleaned. The saw 12 will then cut a slice of meat. The meat is then brought back with the table 13 and then the cut portion of the meat 15 urged against the face 19 of the cover on the attachment and this portion then passed over the brush 23 so that its surface is cleaned. By having the guide rods 20 curve over the front wall edge of the frame 18 to define the hook shape, the meat is held in spaced relationship to the wall edge and will not catch against this edge. After this section of the meat is cut by the saw 12, the severed side thereof may be cleaned by hand or passed over a rotary brush similar to that shown. Alternatively, the cut pieces of meat may be stacked up and then their opposite sides all cleaned by removing the attachment 17 and placing it in a horizontal position with the channels 22 and 25 and the brackets 26 and 27 serving as feet. The other sides of the meat that have not been cleaned may then be passed over the brush 23 by sliding the same along the top of the cover surface 19.

To clean the device as described, it is a simple matter to remove the cover and also to remove or uncouple the brush 23. After cleaning, the brush may be easily replaced there being required no special tools in view of the unique sleeve arrangement described in conjunction with FIGURE 4. The motor 21 rotates the brush on the order of 3450 r.p.m. This high rotative speed helps keep the brush clean in that it will throw by centrifugal force all bone dust and the like caught in the brush against the inner walls of the frame 18. Since the entire front cover and brush are removed for cleaning purposes, access to the interior walls of the frame 18 is very easy.

While only one particular embodiment of the invention has been set forth and described, minor variations that fall clearly within the scope and spirit of the invention will occur to those skilled in the art. The meat cleaning attachment is therefore not to be thought of as limited to the one embodiment set forth merely for illustrative purposes.

What is claimed is:

1. A meat cleaning attachment for securement to the guide plate on a meat saw table for cleaning meat comprising, in combination: a box-like frame having a removable cover plate, said cover plate including elongated guide rods defining open spaces therebetween to expose the interior of said frame; an elongated brush of generally cylindrical shape rotatably mounted in said frame in a position to brush meat moved along said guide rods; a motor mounted on said frame; coupling means coupling said motor to said brush to rotate the same; and bracket means on the exterior of said frame adapted to receive the upper edge of a saw table guide plate to secure said attachment to said guide plate.

2. An attachment according to claim 1, in which said box-like frame has a front wall and a rear wall, said guide rods in said cover plate having forward ends terminating in a hook shape to engage about said front wall of said frame, said cover plate having a rear edge terminating in a flange overlapping said rear wall of said frame; and set screw means for securing said flange to said rear wall.

3. An attachment according to claim 2, in which said motor includes a drive shaft and said brush has a central brush shaft, said coupling means including a sleeve member receiving said drive shaft in one end and said brush shaft in its other end; means locking said sleeve against rotation relative to said shafts when said shafts are received therein, said sleeve being slidable along said drive shaft whereby said sleeve may be moved along said drive shaft until said brush shaft is free, the lower end of said brush shaft being received in a conical bearing so that said brush may be tilted slightly and removed from said frame for cleaning purposes.

4. An attachment according to claim 3, in which said motor is mounted to said frame by means of angle members cooperating with said bracket members to define feet for supporting said brush in a horizontal position when said attachment is not mounted on said guide plate.

References Cited by the Examiner
UNITED STATES PATENTS

| | | | |
|---|---|---|---|
| 1,781,956 | 11/1930 | Rugamer | 15—21 |
| 2,826,772 | 3/1958 | Smith | 15—3.17 |
| 2,835,296 | 5/1958 | Harrison | 15—236 X |
| 2,932,042 | 4/1960 | Scott | 15—77 X |
| 3,061,856 | 11/1962 | Czapar | 15—3.1 |

CHARLES A. WILLMUTH, *Primary Examiner*.